United States Patent [19]

Yamashita et al.

[11] Patent Number: 4,981,635
[45] Date of Patent: Jan. 1, 1991

[54] METHODS FOR PRODUCING A RESIN-BONDED MAGNET

[75] Inventors: Fumitoshi Yamashita, Ikoma; Masami Wada, Hirakata; Masaharu Miyagawa; Hiroshi Dohi, both of Takefu, all of Japan

[73] Assignee: Matsushita Electric Industrial Co., Ltd., Osaka, Japan

[21] Appl. No.: 316,967

[22] Filed: Feb. 28, 1989

[30] Foreign Application Priority Data

| Feb. 29, 1988 | [JP] | Japan | 63-46202 |
| Feb. 29, 1988 | [JP] | Japan | 63-46203 |
| Feb. 29, 1988 | [JP] | Japan | 63-46232 |
| Mar. 17, 1988 | [JP] | Japan | 63-63976 |

[51] Int. Cl.$^5$ .......................... B29C 43/18; B22F 7/04
[52] U.S. Cl. .................................. 264/112; 264/122; 264/DIG. 58; 264/327; 264/236; 425/78; 425/DIG. 33; 252/62.54
[58] Field of Search ............... 264/109, 112, 122, 123, 264/128, DIG. 58, 108, 236, 347, 113, 327, 63, 104; 425/78, 3, 79, DIG. 33; 29/DIG. 1, DIG. 85, 527.1, 419.2; 252/62.58, 62.6, 62.63, 62.54

[56] References Cited

U.S. PATENT DOCUMENTS

| 2,463,413 | 3/1949 | Neel | 264/109 |
| 3,024,392 | 3/1962 | Baermann | 264/122 |
| 3,223,668 | 12/1965 | Stalego | 264/109 |
| 3,246,060 | 4/1966 | Blume | 264/104 |
| 3,281,515 | 10/1966 | Schmitz | 264/347 |
| 3,677,947 | 7/1972 | Ray et al. | 264/DIG. 58 |
| 3,840,624 | 10/1974 | Tombs | 264/122 |
| 3,849,213 | 11/1974 | Baermann | 264/DIG. 58 |
| 3,974,246 | 8/1976 | Chen et al. | 264/24 |
| 4,324,753 | 4/1982 | Gill | 264/122 |
| 4,504,543 | 3/1985 | Yamashita et al. | 264/122 |
| 4,678,634 | 7/1987 | Tawara et al. | 29/DIG. 95 |
| 4,684,406 | 8/1987 | Matsuura et al. | 264/DIG. 58 |

FOREIGN PATENT DOCUMENTS

| 2948989 | 3/1981 | Fed. Rep. of Germany | 264/122 |
| 59-136908 | 8/1984 | Japan | 264/122 |
| 61-272914 | 12/1986 | Japan | 264/DIG. 58 |
| 1007832 | 3/1983 | U.S.S.R. | 264/112 |
| 1103944 | 7/1984 | U.S.S.R. | 264/125 |

*Primary Examiner*—Jeffery Thurlow
*Assistant Examiner*—Mathieu Vargot
*Attorney, Agent, or Firm*—Wenderoth, Lind & Ponack

[57] ABSTRACT

A method for producing a resin-bonded magnet, which includes steps of mixing a magnet element and microcapsules each of which contains at least one component of a thermally polymerizable resin composition as a binder component, mechanically breaking at least a part of the microcapsules during formation of a green compact comprising said resin composition and said magnet element to discharge the components of said resin composition from the capsules, and curing said resin to produce the resin-bonded magnet.

4 Claims, 6 Drawing Sheets

METHODS FOR PRODUCING A RESIN-BONDED MAGNET

BACKGROUND OF THE INVENTION

1. Field of the Invention

The present invention relates to a method for producing a resin-bonded magnet and a method for producing an article comprising said resin-bonded magnet. More particularly, the present invention relates to a method for producing a resin-bonded magnet comprising a melt-spin Fe-B-R type magnetic element in which R is Nd and/or Pr and an epoxy resin composition, and a method for producing an article comprising said resin-bonded magnet such as a rotor member of a so-called permanent magnet motor.

2. Description of the Related Art

The resin-bonded magnet is usually formed into a ring-form article such as a ring, a cylinder or a C-shape article, and a supporting member for such molded article also has a ring form or a hollow or solid cylinder form although the supporting member optionally has an engaging element.

It is, however, very difficult to form a ring-form article from the sintered magnet which comprises a rare earth element and cobalt and has, for example, a composition of $$RCo_5 \text{ or } R(Co, Cu, Fe, M)_n$$

wherein R is a rare earth element such as Sm and Ce, M is at least one element selected from the group consisting of the elements of the IV, V, VI and VII groups in the Periodic Table, and n is an integer of 5 to 9, and to impart magnetic anisotropy in a radial direction of said ring-form article. One of the major reasons for this difficulty resides in the fact that coefficients of expansion vary due to anisotropy during sintering. Particularly, when a thin wall ring magnet is to be produced, this drawback should be avoided through isotropy of magnetic properties. Thus, the magnetic characteristic of the sintered rare earth element-cobalt magnet decreases from its inherent value of 20 to 30 MGOe to only about 5 MGOe. In case of the rotor member of the permanent magnet motor which requires high dimensional accuracy, ground finish of the formed rotor member is necessary, which results in a poor yield. In view of such poor yield and use of expensive Sm and Co as major components, the performance and the production cost of the rotor member are not well balanced. Further, since the sintered magnet is mechanically fragile, a part of the magnet will be peeled off, splashed or transferred to another element. This will influence the maintenance of the function or reliability of the permanent magnet motor.

In case of the ring-form article made of the compound of the rare earth element-cobalt magnet and the resin, since the resin matrix compensates for the difference of coefficients of expansion of the magnet which is made anisotropic in the radial direction, the ring-form magnet article can have the magnetic anisotropy in the radial direction. For example, when the magnetic anisotropy is imparted to the injection-molded resin-bonded magnet comprising the rare earth element-cobalt magnet in the axial direction, a magnet with 8 to 10 MGOe is obtained. Further, the compound magnet has a 30% smaller density and higher dimensional accuracy and is less fragile than the sintered magnet. Therefore, the resin-bonded magnet is a superior material for producing the ring-form magnet, particularly the thin wall ring-form magnet, as compared to the sintered magnet.

As the compound magnet with high magnetic performances, there is known is a resin-bonded magnet comprising a magnet having the composition of

$$Sm(Co, Cu, Fe, M)_n$$

wherein M and n are the same as defined above bound with 2 to 6% by weight of an epoxy resin composition.

Herein, the epoxy resin composition is intended to mean a composition comprising an epoxy resin and a curing agent which three-dimensionally cross links the epoxy resin.

In some cases, the epoxy resin composition may have large influence on the productivity or the performance of the resin-bonded magnet.

In the context of the present specification, the epoxy resin is intended to mean a compound having at least two oxirane rings of the formula:

wherein Y is a polyfunctional halohydrin, which may be a residue formed through a reaction between epichlorohydrin and a polyfunctional phenol. Preferred examples of the polyfunctional phenol are resorcinol and bisphenols which are produced by condensation of phenol with an aldehyde or a ketone. Specific examples of the bisphenols are 2,2'-bis(p-hydroxyphenylpropane) (bisphenol-A), 4,4'-dihydroxybiphenyl, 4,4'-dihydroxybiphenylmethane, 2,2'-dihydroxydiphenyloxide and the like. One of the most general epoxy resins is the compound of the formula:

wherein R is a divalent group selected from the group consisting of a saturated alkylene group having 1 to 8 carbon atoms, an oxygen atom and a sulfone group, y is an integer of 0 to 25, and m is 0 or 1.

A typical example of this epoxy resin is a condensation product of epichlorohydrin and bisphenol-A (DGEBA).

Examples of the curing agent for the epoxy resin are, in case of the resin-bonded magnet comprising the magnet element of Sm(Co, Cu, Fe, M)$_n$, azole compounds having an amino group and specifically the imidazoles of the formula:

wherein $R_{11}$, $R_{12}$, $R_{13}$ and $R_{14}$ are the same or different and each a hydrogen atom, a lower alkyl group, a phenyl group or a lower alkyl-substituted phenyl group, examples of which are imidazole, 2-ethyl-4-methylimidazole, 1-benzyl-2-methylimidazole, 1-methylimidazole, 1,2-dimethylimidazole and the like (cf Japanese Patent Kokai Publication Nos. 37106/1985 and 207302/1985).

The epoxy resin composition comprising the above described epoxy resin (e.g. DGEBA) and the imidazole compound as the curing agent generally gives a cured epoxy resin having good chemical resistance and heat resistance. Therefore, such epoxy resin composition is useful to produce the resin-bonded magnet comprising the epoxy resin composition and the magnet of Sm(Co, Cu, Fe, M)$_n$ which compound has improved chemical resistance and further a reduced irreversible coefficient at high temperatures.

However, since the imidazole compounds are solid materials having high melting points of usually higher than 200° C., their mixing with the epoxy resin composition is very difficult, and the duration of use of the epoxy resin composition comprising the imidazole compounds is usually less than a week at room temperature. Further, the epoxy resin composition comprising the epoxy resin and the curing agent is gradually polymerized and cured to form dimers or trimers, whereby viscosity of the composition is increased. Since the viscosity of the epoxy resin composition will be increased also in the mixture of said composition with the magnet, when the resin-bonded magnet comprising the magnet of Sm(Co, Cu, Fe, M)$_n$ with magnetic anisotropy is to be produced, a degree of magnetic orientation is decreased due to increase of viscosity and for example a residual magnetic flux density is reduced depending on the viscosity increase. Finally, the mixture forms gel, which makes the production of the resin-bonded magnet difficult.

When it is necessary to impart the magnetic anisotropy to the magnet such as Sm(Co, Cu, Fe, M)$_n$, usually the epoxy resin composition is in the liquid form at room temperature so as to make the magnetic orientation easy. However, since the liquid epoxy resin composition has no flowability suitable for compression molding, it is extremely difficult to prepare a green compact for the production of the resin-bonded magnet article. In addition, since the green compact has very low mechanical strength, it is difficult to obtain the resin-bonded magnet article having good quality and performance.

To overcome such defects of the epoxy resin composition, many proposals and suggestions have been made in relation with properties of a binder to be used in the preparation of the green compact. For example, Japanese Patent Kokai Publication No. 63808/1980 discloses the preparation of the green compact by dry blending fine powder of a thermally polymerizable resin and the magnet element. Although this method has some effects on the maintenance of the property of the green compact, a large amount of the binder is required to homogeneously wet the surface of each magnet particle with the thermally polymerizable resin fine powder. As the result, the content of the magnetic element decreases and then the magnetic performance of the magnetic is deteriorated. Japanese Patent Kokai Publication No. 194509/1985 discloses a method for producing a resin-bonded magnet article comprising coating the magnetic element particles with a thermally polymerizable resin composition which is in the solid state at room temperature, molding the green compact at a temperature higher than the softening point of the thermally polymerizable resin and releasing the molded article from the mold at a temperature lower than said softening point. Although this method has some effects on the maintenance of property and performance of the green compact, during molding, the green compact should be heated and cooled in relation to the softening point of the resin. This will create difficult problems in maintenance of production facilities for technical mass production of the resin-bonded magnet articles.

Since some salts of the imidazole compounds with lower fatty acids or phosphoric acid are liquids or solids with lower melting points, the use of such salt will facilitate blending of the epoxy resin with the imidazole compounds. Since the use of such salt will extend the duration of use of the epoxy resin composition, the production of the resin-bonded magnet article which requires the achievement of magnetic anisotropy is stabilized. However, the reaction of the salt of imidazole compound with the epoxy resin produces the monofunctional epoxy resin since the acid residue of said salt reacts with the epoxy resin. Thereby, the crosslink density is decreased so that the chemical and heat resistances of the epoxy-resin composition are deteriorated. The stability of the imidazole salt in which the basicity is neutralized with the acid is improved as the acidity of the acid becomes larger. But, this will further deteriorate the chemical and heat resistances of the epoxy resin composition. That is, the advantageous characteristics of the resin-bonded magnet comprising the imidazole compounds such as chemical resistance and suppression of the irreversible coefficient are deteriorated.

It is possible to produce, for example, a ring-form article from the magnetic element Sm(Co, Cu, Fe, M)$_n$ and to impart magnetic anisotropy in the radial direction. For example the method for imparting the magnetic anisotropy to the ring-form article in the radial direction disclosed in Japanese Patent Kokai Publication No. 170501 uses a mold in which magnetic yokes and non-magnetic yokes are alternately arranged around the mold cavity and a magnetizing coil is provided outside the mold or the magnetizing coil is embedded in a mold wall surrounding the cavity. In this method, to generate predetermined strength of magnetic field, a power source with low voltage and large current is used and a magnetomotive force is made large. To effectively focus a magnetic flux excited from outside the mold with the magnetizing coil through the yokes, a magnetic path should be made longer. Particularly, in case of a small ring-form magnet, a large portion of the magnetomotive force is consumed as leakage flux. The magnetic anisotropy in the radial direction cannot be sufficiently imparted to some ring articles having a certain shape. In addition, because of volumetric shrinkage caused by solidification of melt resin-bonded magnet comprising the rare earth element-cobalt magnet element during molding, the ring-form magnet with a thin wall may be cracked. In view of the above described difficulties such as maintenance of the magnetic property in the radial direction or volumetric shrinkage due to solidification of the melt, even the rare earth element-cobalt magnet element has poor shape flexibility in the production of the ring magnet. This will have large influence on design philosophy of the permanent magnet motor including the performance and structure. When the ring-form magnet is used as a rotor member of the permanent magnet motor, the ring-form magnet is often fixed to a shaft through a support made of a material which varies from non-magnetic to magnetic, rather than the ring-form magnet being directly fixed to the shaft. In the former case, the ring-form magnet and the support are mechanically engaged or bonded with an adhesive which is supplied in a narrow gap between them. This is because, in case of the ring-form magnet which requires the generation of magnetic anisotropy in the radial direction, it is very difficult to form the support of a material which varies from non-magnetic to magnetic integral with the ring-form magnet because of limitations on the mold structure with which the ring-form magnet is molded. When the ring-form magnet and the support are mechanically engaged, the ring-form magnet tends to be damaged. When they are bonded with the adhesive, since the gap in which the adhesive is supplied should be present between the ring magnet and the support, bonding strength and dimensional accuracy between the ring-form magnet and the support are not sufficient or the workability is not good. Thus, improvement of assembling property is desired.

SUMMARY OF THE INVENTION

One object of the present invention is to provide a method for producing a resin-bonded magnet, which can overcome the drawbacks of the conventional method for the production of a small light ring-form magnet with a thin wall, and has improved assembling property.

Another object of the present invention is to provide a method for producing an article comprising said resin-bonded magnet such as a ring-form magnet.

According to the first aspect of the present invention, there is provided a method for producing a resin-bonded magnet, which comprises steps of mixing a magnet element and microcapsules each of which contains at least one component of a thermally polymerizable resin composition as a binder component, mechanically breaking at least a part of the microcapsules during formation of a green compact comprising said resin composition and said magnet element to discharge the components of said resin composition from the capsules, and curing said resin to produce the resin-bonded magnet.

According to the second aspect of the present invention, there is provided a method for producing a resin-bonded magnet, which comprises steps of granulating an Fe-B-R type magnet raw material with an epoxy resin which is in the solid form at least at room temperature, dry mixing the resulting granules with a fine powder of a latent curing compound for the epoxy resin together with a lubricant, forming a green compact from the resulting mixture by compression molding, and heating the green compact to cure the epoxy resin to produce the resin-bonded magnet.

The third aspect of the present invention relates to the production of a resin-bonded magnet article such as the rotor member of the permanent magnetic motor which is required to be thin and to have high efficiency and high performance as well as to be assembled easily. Accordingly, there is provided a method for producing a resin-bonded magnet article, which comprises steps of providing a granular compound comprising an Fe-B-R type magnet wherein R is at least one element selected from the group consisting of Nd and Pr and a curable binder resin in a cavity formed by a support member and a mold wherein the support is heated at a temperature higher than the softening point of the binder resin and the mold is heated at a temperature lower than said softening point, pressing the granular compound in the cavity to form a green compact which is integrated with the support member and curing the binder resin to produce the resin-bonded magnet article.

According to the fourth aspect of the present invention, there is provided a method for producing a resin-bonded magnet article comprising steps of providing a granular compound comprising an Fe-B-R type magnet wherein R is at least one element selected from the group consisting of Nd and Pr and microcapsules each of which contains at least one component of a thermally polymerizable resin composition as a binder component in a cavity formed by a support member and a mold, pressing the granular compound in the cavity and mechanically breaking at least a part of the microcapsules to discharge the components of said resin composition from the capsules to form a green compact which is integrated with the support member and curing the thermally polymerizable resin to produce the resin-bonded magnet article. Such granular compound can be prepared by forming an intermediate granuale from the magnet element and at least one binder resin other than the microcapsules and then mixing the intermediate granule with the microcapsules and optional additives.

The support member can be a laminated electromagnetic steel sheet which may be used as the rotor material of the permanent magnet motor.

DETAILED DESCRIPTION OF THE INVENTION

Preferably, the thermally polymerizable resin composition used in the present invention is the epoxy resin composition which is used as the binder in the conventional resin-bonded magnet. The epoxy resin composition herein used is intended to mean a composition comprising an epoxy resin, a curing agent for three dimensionally cross linking the epoxy resin and optional additives which may be reactive or unreactive with the essential components.

The epoxy resin is intended to mean a compound having at least two oxirane rings of the formula:

wherein Y is a polyfunctional halohydrin, which may be a residue formed through a reaction between epichlorohydrin and a polyfunctional phenol. Preferred examples of the polyfunctional phenol are resorcinol and bisphenols which are produced by condensation of phenol with an aldehyde or a ketone. Specific examples of the bisphenols are 2,2'-bis(p-hydroxyphenylpropane) (bisphenol-A), 4,4'-dihydroxybiphenyl, 4,4'-dihydroxybiphenylmethane, 2,2'-dihydroxybiphenyloxide and the like. These may be used independently or as a mixture thereof. Examples of the preferably usable epoxy resins are glycidyl ether type ones of the formula:

wherein $R_1$ is a hydrogen atom or a methyl group, $R_2$ to $R_9$ are the same or different and each is a hydrogen atom, a chlorine atom, a bromine atom or a fluorine atom, A is an alkylene group having 1 to 8 carbon atoms, —S—, —O—, or —CO$_2$—, and n is an integer of 0 to 10.

The curing agent also may be any of the conventionally used ones. Specific examples of the curing agent are aliphatic acid polyamines, polyamides, heterocyclic diamines, aromatic polyamines, acid anhydrides, aromatic ring-containing aliphatic polyamines, imidazoles, organic acid dihydrazide, polyisocyanates, etc and mixtures thereof.

Specific examples of the optionally used additives are monoepoxy compounds, aliphatic acids and their metal soaps, aliphatic acid amides, etc.

The microcapsules containing the components of the thermally polymerizable resin composition may be prepared by a known in situ polymerization process which comprises suspension polymerizing a monomer in the presence of such components. Preferred examples of the monomer to be used for the formation of the microcapsules are vinyl chloride, vinylidene chloride, acrylonitrile, styrene, vinyl acetate, acrylates and mixtures thereof. The suspension polymerization can be carried out in the presence of a cross linking agent for a polymer prepared from these monomers.

Preferably, the components of the thermally polymerizable resin composition are in the liquid form at room temperature and inactive with the material of the microcapsules.

Each microcapsule preferably has a single nuclear spherical form and a particle size of several to several ten micrometers.

Two or more different components of the thermally polymerizable resin composition may be contained in one microcapsule.

Other materials which may be contained in the microcapsules should form a non-cohesive solid in the finally prepared binder.

As understood from the above, various combinations of the materials are possible according to the present invention. The materials to be used in the methods of the present invention include, for example, (A) the component of the thermally polymerizable resin composition, which component is in the solid form at room temperature, (B) the component of the thermally polymerizable resin composition, which component is in the liquid form at room temperature, (C) the component of the thermally polymerizable resin composition contained in the capsules, which component is in the liquid form at room temperature, and (D) the magnetic element. Then, the combinations of the materials include a combination of (A), (B), (C) and (D), of (A), (C) and (D), of (B), (C) and (D) and of (C) and (D). When the material (B) is used, care should be taken on its influence on the flowability as the raw material for compression molding and the mechanical strength of the green compact.

When the epoxy resin in the solid form at room temperature is used in the present invention, it should be easily soluble in an organic solvent. For example, the condensation product of epichlorohydrin and bisphenol-A (DGEBA) having a molecular weight of 900 or higher is in the solid form at room temperature.

The latent curing compound used according to the present invention can be at least one hydrazide compound selected from the group consisting of dicyanediamide and its derivatives, carboxylic acid dihydrazide and diaminomaleonitrile and its derivatives. These compounds have high melting points and are difficultly soluble in an organic solvent. Preferably, they have an average particle size of several to several ten micrometers. The dicyanediamine derivatives are represented by the formula:

wherein $R_{15}$ and $R_{16}$ are the same or different and each is hydrogen, a lower alkyl group or a substituted or unsubstituted aromatic group. Specific examples of the dicyanediamine derivatives are o-tolylbiguanide, α-2,5-dimethylbiguanide, α,ω-diphenylbiguanide, 5-hydroxynaphthyl-1-biguanide, phenylbiguanide, α,ω-dimethylbiguanide, etc.

Carboxylic acid dihydrazide is represented by the formula:

wherein $R_{17}$ is a divalent hydrocarbon group such as an alkylene group, a divalent aromatic group such as phenylene group or the like. Examples of the carboxylic acid dihydrazine are succinic acid hydrazide, adipic acid hydrazide, isophthalic acid hydrazide, p-oxybenzoic acid hyrazide, etc.

The lubricant herein used includes higher fatty acids and their metal soaps, hydrocarbons, fatty acid amides, etc.

The Fe-B-R type magnet element may be prepared by the melt spin method such as a single roll method as disclosed in Japanese Patent Kokai Publication No. 64739/ 1984. The produced thin particles may be used as such or thermally treated and used in the present invention. Preferably, such magnet element has a composition of the formula:

wherein R is the same as defined above, and x, y and z are atomic percentages of Co, R and B, respectively and satisfy the following equations:

$0 \leq x \leq 30$, $10 \leq y \leq 28$, $2 \leq z \leq 12$, $y + z \leq 34$ and $6z + y \leq 34$.

Insofar as the inherent properties of the permanent magnet element are not impaired, the magnet element may further include randomly at least one of other elements such as Co, C, N, Si, P, Ge, Mo, Pd, Zr, Y, Tb, etc, or a part of Fe, B and/or R may be regularly replaced with such other elements. In addition, the particles of the melt-spin Fe-B-R type magnet element may have a coating film of a mono- or multi-molecular layer of a carbon-functional silane thereon.

The coercive force of the melt-spin Fe-B-R type magnet element is based on the $R_2Fe_{14}B$ tetragonal system. The crystal orientation of the tetragonal system is random in the particles. That is, in general, the particles are magnetically isotropic. Therefore, this type of the magnetic element requires no magnetic orientation treatment during the molding of the resin-bonded magnet, which is inevitable in the Sm(Co, Cu, Fe, M)$_n$.

PREFERRED EMBODIMENTS OF THE INVENTION

The present invention will be explained by the following Examples, wherein "%" and "parts" are by weight unless otherwise indicated.

EXAMPLE 1

The alloy of Sm(Co$_{0.668}$, Cu$_{0.101}$, Fe$_{0.214}$, Zr$_{0.017}$)$_{7.33}$ was melted at 1,150° C. for 24 hours and then aged at 800° C. for 24 hours and then at 600° C. for 1 hour. The alloy was ground, sieved and blended by the conventional methods to obtain a magnet element having particle sizes in the range of 53 to 200 μm.

In a separate step, methyl methacrylate and acrylonitrile (in a molar ratio of 50:50) were suspension polymerized (in situ polymerization) in the presence of the glycidyl phenyl ether of the formula:

namely 4,4′-bis(2,3-epoxypropyl)phenyl ether (70 g) to obtain the microcapsules comprising the cells made of the methyl methacrylate/acrylonitrile copolymer and containing the epoxy resin which is liquid at room temperature. The content of the epoxy resin was 70% based on the total weight of the microcapsules, and the average particle size of the microcapsules was 16 μm.

The magnet element and the microcapsules were mixed with 2-ethyl-4-methylimidazole as the thermally polymerizable resin component to obtain a resin-bonded magnet raw material having the following composition:

| | |
|---|---|
| Sm(Co, Cu, Fe, Zn)$_n$ | 95.9% |
| Microcapsules | 4.0% |
| 2-Ethyl-4-methylimidazole | 0.1% |

A portion of the resulting resin-bonded magnet raw material was charged in a cylindrical cavity of a mold of a compression molding machine with which magnetic anisotropy can be imparted to a molded material, and pressed under pressure of 8 Ton/cm² with applying the magnetic field of 15 KOe in the axial direction of the cavity to form a cylindrical green compact having a diameter of 10 mm.

Before the molding the raw material had powder flowability of 50–60 sec./50 g, but the surface of the green compact was slightly wet with the diglycidyl phenyl ether which was discharged from the mechanically broken microcapsules. No crack or partial peeling off of the magnet element was found in the green compact.

The green compact was heated at 120° C. for 30 minutes to obtain a resin-bonded magnet having a density of 6.85 g/cm$^3$, a residual magnetic flux density of 7.6 KG and a maximum energy product of 12.5 MGOe.

Another portion of the resin-bonded magnet raw material was stored at 40° C. for 30 days and then processed in the same way as above to obtain a green compact and then a resin-bonded magnet. There was no appreciable difference in moldability of the raw material, the appearance of the green body and the magnetic characteristics of the resin-bonded magnet.

COMPARATIVE EXAMPLE 1

96.0 parts of Sm(Co, Cu, Fe, Zn)$_7$ which was prepared in the same manner as in Example 1, 3.8 parts of 4,4'-bis(2,3-epoxypropyl)phenyl ether and 0.2 part of 2-ethyl 4-methylimidazole were mixed, and from the mixture, a resin-bonded magnet was directly produced.

Since the presence of 4,4'-bis(2,3-epoxypropyl)phenyl ether deteriorated the flowability of the mixture, the mixture could not be uniformly charge in the cavity of the mold. From the green compact, a part of the magnet element was easily peeled off so that the green compact had poor handleability. The resin-bonded magnet with the density of 6.5 g/cm$^3$ had a residual magnetic flux density of 6.8 KG and a maximum energy product of 10.6 MGOe. When the raw material was stored at 40° C. for 30 days, it was difficult to produce a green body.

EXAMPLE 2

A melt spun thin sheet of a material of Nd$_{15}$Fe$_{75}$B$_{10}$ was compressed at room temperature to form a green compact, which was hot pressed at 700° C. and subjected to die up setting to produce an alloy which had a relative density of 98–99% and axes of easy magnetization in the compressed direction. The alloy was ground, sieved and blended by the conventional methods to obtain a magnet element having particle sizes in the range of 53 to 200 μm.

In a separate step, vinylidene chloride and acrylonitrile (in a molar ratio of 50:50) were suspension polymerized (in situ polymerization) in the presence of 11% butyl glycidyl ether-substituted DGEBA to obtain microcapsules (Microcapsules I) comprising cells made of the vinylidene chloride/acrylonitrile copolymer and containing the epoxy resin which is liquid at room temperature. In the same manner as above, additional microcapsules (Microcapsules II) comprising cells made of the vinylidene chloride/acrylonitrile copolymer and containing 4-methyl-hexahydrophthalic anhydride were prepared.

The content of the epoxy resin or 4-methyl-hexahydrophthalic anhydride was 70% based on the total weight of the microcapsules, and the average particle size of each of Microcapsules I and II was 10 μm.

The magnet element and the microcapsules were mixed with imidazole as the curing aid which is one of the thermally polymerizable resin components to obtain a resin-bonded magnet raw material having the following composition:

| | |
|---|---|
| Nd$_{15}$Fe$_{75}$B$_{10}$ | 97% |
| Microcapsules I | 2.0% |
| Microcapsules II | 0.9% |
| Curing aid | 0.1% |

A portion of the resulting resin-bonded magnet raw material was charged in a cylindrical cavity of a mold of a compression molding machine with which magnetic anisotropy can be imparted to a molded material, and pressed under pressure of 8 Ton/cm$^2$ with applying the magnetic field of 15 KOe in the axial direction of the cavity to form a cylindrical green compact having a diameter of 10 mm.

Before the molding the raw material had powder flowability of 50–60 sec./50 g, but the surface of the green compact was slightly wet with the diglycidyl phenyl ether which was discharged from the mechanically broken microcapsules.

The green compact was heated at 120° C. for 1 hour to obtain a resin-bonded magnet having a residual magnetic flux density of 8.9 KG and a maximum energy product of 16 MGOe.

Another portion of the resin-bonded magnet raw material was stored at 40° C. for 30 days and then processed in the same way as above to obtain a green compact and then a resin-bonded magnet. There was no appreciable difference in moldability of the raw material, the appearance of the green body and the magnetic characteristics of the resin-bonded magnet.

In another embodiment, a magnetically anisotropic Fe-B-R type magnet element is granulated together with the epoxy resin which is solid at room temperature by mixing the epoxy resin which has been completely dissolved in an organic solvent with a predetermined amount, for example, 96 to 98% of Fe-B-R type magnet element, evaporating off the solvent and then grinding the residual solid. Since only the solid epoxy resin is present at this stage, the epoxy resin is not polymerized by heating during the evaporation of the solvent.

Figure 1:
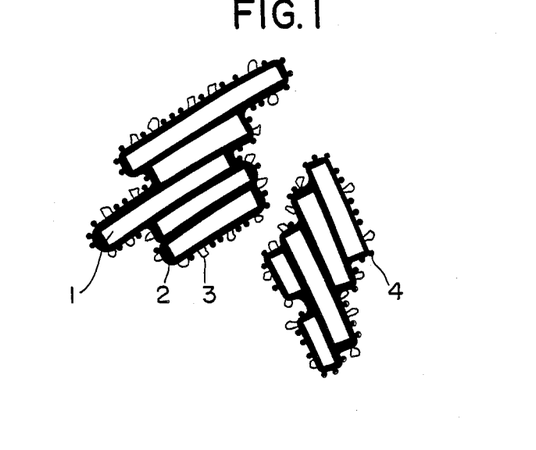
FIG. 1 schematically shows the state of the mixture comprising granules, a fine power latent curing compound and a lubricant in Example 2.

Then, the above granules, a fine powder latent curing compound and a lubricant are dry blended. The state of this mixture is schematically shown in FIG. 1, in which numeral 1 stands for the Fe-B-R type magnet element, 2 stands for the epoxy resin which is solid at room temperature, 3 stands for the fine powder latent curing compound, and 4 stands for the lubricant. The mixture such as this has good shelf life and moldability since the epoxy resin is very inactive in polymerization and the mixture itself is less tacky. Preferably, the amount of the fine powder latent curing compound is not less than that of the epoxy resin.

The above mixture is compression molded by the conventional method to form a green compact. Since the major component of the mixture is the Fe-B-R type magnet element, magnetic orientation is not necessary. Further, since the mixture has good moldability in the compression molding, it can be conveniently molded to form the green compact of a desired shape. By curing the epoxy resin in the green compact, a resin-bonded magnet is produced.

Following Examples will illustrate the above embodiment.

EXAMPLE 3

An Fe-B-R type magnet element was prepared from 68.80% of Fe, 25.2% of Nd, 0.93% of B, 4.20% of Co and 1.01% of Pr by the melt spin method. The produced magnetic element had a particle size distribution shown in Table 1.

TABLE 1

| Particle size (μm) | % |
|---|---|
| <53 | 10.9 |
| 53-75 | 11.9 |
| 75-105 | 23.1 |
| 105-150 | 26.6 |
| 150-250 | 26.6 |
| 250-350 | 0.8 |
| 350< | 0 |

With 98 parts of the produced Fe-B-R magnet element, 2 parts of the epoxy resin (DGEBA having a molecular weight of 900) in the form of a 50% solution in acetone was mixed in a kneader. After evaporating off the solvent, the residual solid was ground to obtain a powder having a particle size distribution of Table 2 (Step A).

TABLE 2

| Particle size (μm) | % |
|---|---|
| <53 | 5.0 |
| 53-75 | 8.7 |
| 75-105 | 12.5 |
| 105-150 | 14.3 |
| 150-250 | 33.3 |
| 250-350 | 25.8 |
| 350< | 2.4 |

The flowability of the granules comprising the Fe-B-R type magnet element and the epoxy resin which was solid at room temperature was 62 sec./50 g.

To prepare a fine powder latent curing compound, 1,3-bis(hydrazinocarboethyl)-5-isopropylhydantoin of the formula:

having particle sizes of 5 to 20 μm was weighted so that the amount of the latent curing compound was 20 parts per 100 parts of the epoxy resin, and calcium stearate was weighed so that its amount was 0.2% based on the total weight of the granules and they were dry blended with the granules in a twin cylinder mixer (Step B). Alternately, a fine powder latent curing compound was prepared by using 12 parts of adipic acid dihydrazide and 13 parts of isophthalic acid dihydrazide each per 100 parts of the epoxy resin and mixed with the granules.

The mixture was compression molded to form a cylindrical green compact having a diameter of 10 mm, a height of 10 mm and a relative density of 80% (Step C). Then, the epoxy resin was cured at 120° C. for 15 minutes (Step D).

The obtained resin-bonded magnet had a residual magnetic flux density of 7.3 KG, an intrinsic coercive force of 8.8 KOe and a maximum energy product of 11 MGOe.

COMPARATIVE EXAMPLE 2

The same Fe-B-R type magnet elements as used in Example 3 and the same fine powder latent curing compound as used in Example 3 in a weight ratio of 98:0.4 were dry blended in the twin-cylinder mixer, and then mixed with a 50% solution of the epoxy resin (DGEBA having a molecular weight of 900) in acetone in the same ratio as in Example 3 in the kneader. Then, the solvent was evaporated off and the solid residue was ground.

To the whole ground product, 0.2% of calcium stearate was dry blended and immediately dry molded to form a green compact, which was heated to obtain a resin-bonded magnet. Although the resin-bonded magnet had the same magnetic characteristics as that of Example 3, the resin-bonded magnet which was prepared from the mixture of the ground product and calcium stearate which had been stored at room temperature for 2 days had considerably decreased magnetic characteristics and mechanical strength.

COMPARATIVE EXAMPLE 3

With a Sm(Co, Cu, Fe, M)$_n$ type magnet element consisting of 15.4% of Sm, 4.7% of Nd, 2.0% of Ce, 3.3% of Zr, 50.3% of Co, 16.0% of Fe and 6.7% of Cu, a liquid epoxy resin composition comprising DGEBA having a molecular weight of 350 and imidazole or 2-methylimidazole in an amount of 3% based on the weight of the magnet element was mixed. From the mixture, a cylindrical green compact having the same dimensions as in Example 3 was prepared in the same manner. Immediately after the molding of the green compact, a magnetic field (strength 15 KOe) was applied to the green compact in its axial direction for 2 minutes to impart magnetic anisotropy. Thereafter the green body was heated at 120° C. for 30 minutes to obtain a resin-bonded magnet, which had a residual magnetic flux density of 7.4 KG, an intrinsic coercive force of 9.5 KOe and a maximum energy product of 12 MGOe. When the resin-bonded magnet was produced after storing the mixture at room temperature for 2 days, it had considerably decreased magnetic characteristics and mechanical strength.

Figure 2:
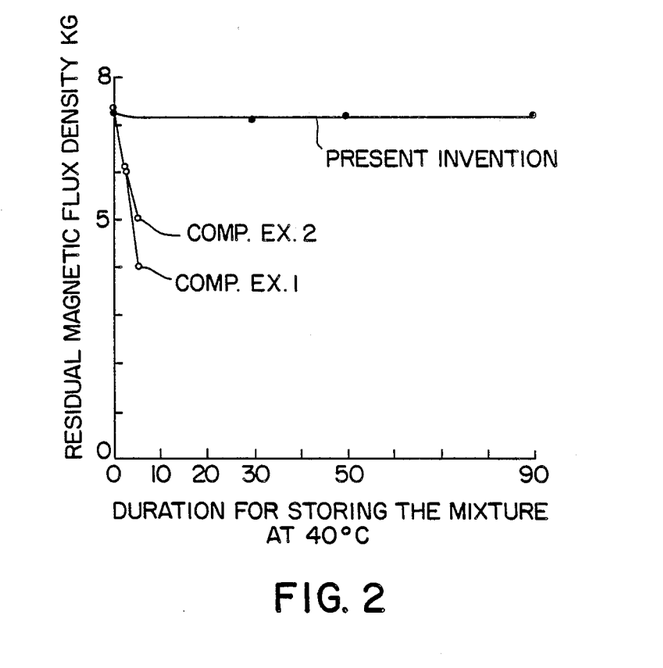
FIG. 2 is a graph showing the relationships between the residual magnetic flux density and the duration for storing the mixture at 40° C., FIGS. 3A to 3E schematically show the actions of a molding machine for directly molding the green compact integrally with a support member according to the present invention.

FIG. 2 shows relationships between the residual magnetic flux density and the duration for storing the mixture at 40° C. As understood from the results in FIG. 2, the resin-bonded magnet of the present invention had far more stable magnetic characteristics than the resin-bonded magnet produced in Comparative Example 2, although both resin-bonded magnets were produced from the same components.

In the following Examples, the production of the resin-bonded magnet article of the present invention will be illustrated.

Now, the procedures for producing the resin-bonded magnet article according to the present invention are explained by way of example by making reference to the drawings.

FIGS. 3A to 3E schematically show actions of a molding machine for directly molding the green compact integrally with a support member from the granular raw material for the resin-bonded magnet according to the present invention.

Figure 3A:
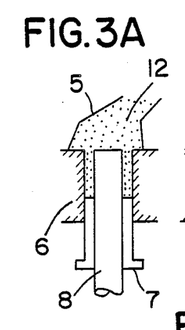
Figures 3B, 3C, 3D, 3E:
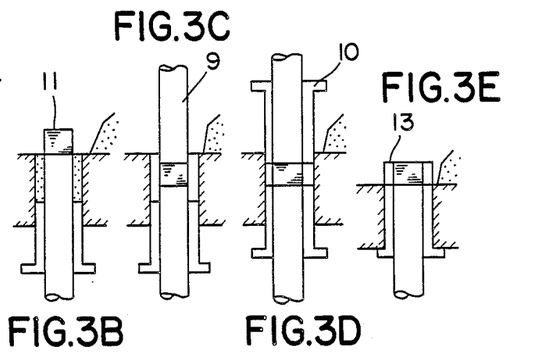

In the machine of FIG. 3, as the die 6 is lifted, a cavity defined by the die 6, the lower punch 7 and the lower floating core 8 is formed. Then, the feeder cup 5 is shifted on the upper surface of the die 6 over the cavity, and the granular compound 12 is flowed into the cavity (FIG. 3A). The feeder cup 5 is shifted away from the cavity to finish the charge of the granular compound (Step A). On the top of the lower floating core 8, there is placed a support member 11 which has been heated to a temperature higher than the softening point of the binder resin in the granular compound 12 as shown in FIG. 3B (Step B). As the upper floating core 9 is lowered, the support member 11 is lowered together with the lower floating core 8 as shown in FIG. 3C (Step C). The temperatures of the die 6, the lower punch 7, and the upper and lower floating cores 8,9 are kept lower than the softening point of the binder resin of the granular compound, while the temperature of the support member is kept higher than said softening point. Under such conditions, the upper punch 10 is lowered and the lower punch 7 is lifted to compress the granular compound 12 in the cavity to the high density as shown in FIG. 3D (Step D). In this step, as the density of the granular compound increases, the formation of the green compact 13 which is compressed and solidified proceeds, while a part of the binder resin in the compound is softened with the heat from the support member 11. Thus, the temperature of the support member is lowered through heat dissipation finally to a temperature lower than the softening point of the binder resin. As the result, the softened binder resin is again solidified and adheres directly to the support member. Thus, the magnet element is firmly bound or partly fused together with the binder, and the green body is bonded to the support member 11 through fusion bonding of the binder to the support member 11 to form the resin-bonded magnet article comprising the integrally bonded green body and the support member.

Then, the green body 13 which is integral with the support member 11 is removed from the machine by lowering the die 6 and lifting the upper punch 10 and the floating core 8 (FIG. 3E) (Step E). In this step, mold releasability of the article is not deteriorated, since none of the mold parts except the support member 11 is fusion bonded to the binder. Thereafter, the binder is polymerized and cured to obtain the resin-bonded magnet article according to the present invention.

The production of the resin-bonded magnet article according to the present invention will be illustrated by the following Examples.

EXAMPLE 4

As the magnet element, there is used the Fe-B-R type magnet element which was produced by the melt spin method and had an atomic composition of:

$$Nd_{0.13}(Fe_{0.93}, B_{0.07})_{0.87},$$

a coercive force of 15 KOe and particle sizes in the range of 53 to 350 μm.

As the binder, a mixture of DGEBA having a softening point of 64° to 70° C., 1,3-bis(hydrazinocarboethyl)-5-isopropylhydantoin having the particle sizes in the range of 5 to 20 μm as the carboxylic acid dihydrazide and calcium stearate was used.

Firstly, a solution of DGEBA (34 g) in acetone (50 ml) was mixed with the magnet element (96 g). After evaporating off acetone, the residual solid was ground, sieved and blended to particle sizes in the range of 53 to 500 μm. Then, the particles were dry blended with the hydrazide (5.8 g) and calcium stearate (0.2 g) to prepare a granular compound containing 96% of the magnet element.

The support member used in this Example was prepared by blanking an electromagnetic steel sheet having a thickness of 0.5 mm to a ring-form plate having an outer diameter of 48 mm and an inner diameter of 8 mm and laminating 22 sheets of such plate.

From the above prepared granular compound and the support member, the resin-bonded magnet article was produced by the steps of A to E shown in FIG. 3.

In the step A, a predetermined amount of the granular compound was filled in the feeder cup 5.

In the step B, the support member preheated at 120° C. was placed on the top of the lower floating core.

In the step C, the upper floating core was lowered to form the cavity in combination with the support member and the mold parts.

In the step D, the granular compound in the cavity was compressed with the upper and lower punches under pressure of 7 ton/cm$^2$ to form the green compact.

In the step E, the green compact integrally bonded to the support member was removed.

The removed green compact was heated at 120° C. for 1 hour to cure the binder.

Figure 4:
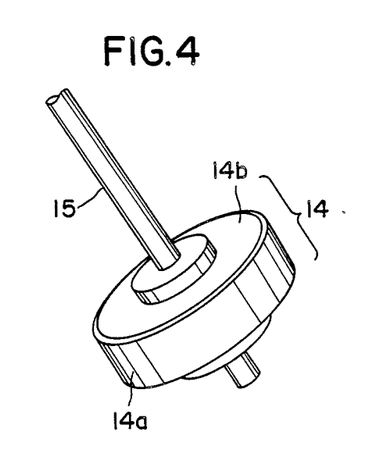
FIG. 4 is a perspective view of a rotor member consisting of the resin-bonded magnet article comprising the support member and the resin-bonded magnet which is directly bonded to the support member, and a rotor shaft assembled in the bore of the composite article.

As shown in a perspective view of FIG. 4, in the center bore of the resin-bonded magnet article 14 comprising the support member 14b and the resin-bonded magnet 14a which was directly bonded to the member 14b, a rotor shaft 15 was inserted to form a rotor member.

Figure 5:
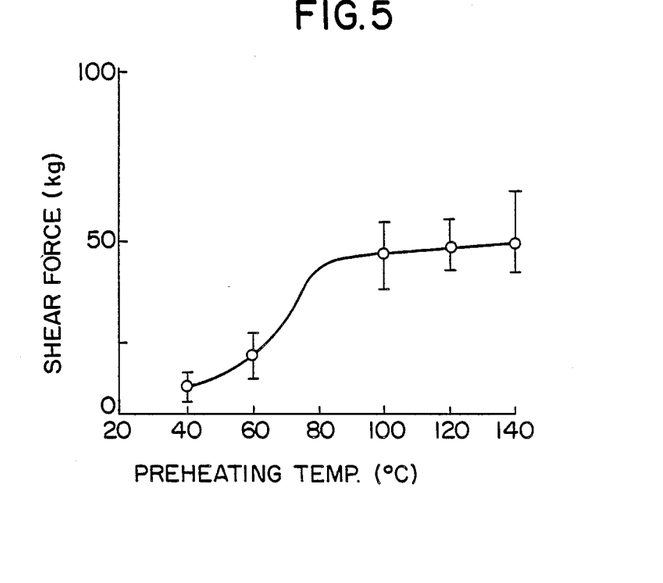
FIG. 5 is a graph showing the relationship between the preheating temperature of the support member and the bonding strength between the resin-bonded magnet and the support member which were integrally bonded according to the present invention.

FIG. 5 is a graph showing the relationship between the preheating temperature of the support member and the integral bonding strength between the resin-bonded magnet and the support member which were integral bonded according to the present invention. The integral bonding strength is expressed in terms of a shear force between the resin-bonded magnet and the support member in the axial direction. As understood from FIG. 5, when the preheating temperature is higher than the softening point of the binder which was 64° to 70° C. in this Example, the resin-bonded magnet is firmly bonded to the support member.

Figure 6:
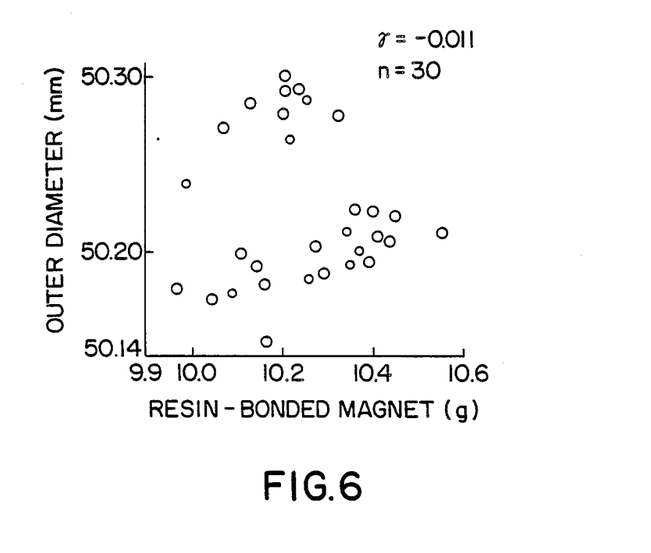
FIG. 6 is a graph showing the relationship between the outer diameter and the weight of the resin-bonded magnet in the rotor member.

FIG. 6 is a graph showing the relationship between the outer diameter and the weight of the resin-bonded magnet in the above rotor member. At the outer diameter of 50.20 mm, the outer diameters of 30 rotor members (n=30) had such excellent dimensional accuracy that the maximum diameter was +0.10 mm and the minimum diameter was −0.06 mm. The coefficient of correlation (γ) of −0.011 suggests that the pressure deviation during the formation of the green compact had less direct influence on spring back of the green compact so that the permanent magnet rotor with high dimensional accuracy could be produced.

Figure 7:
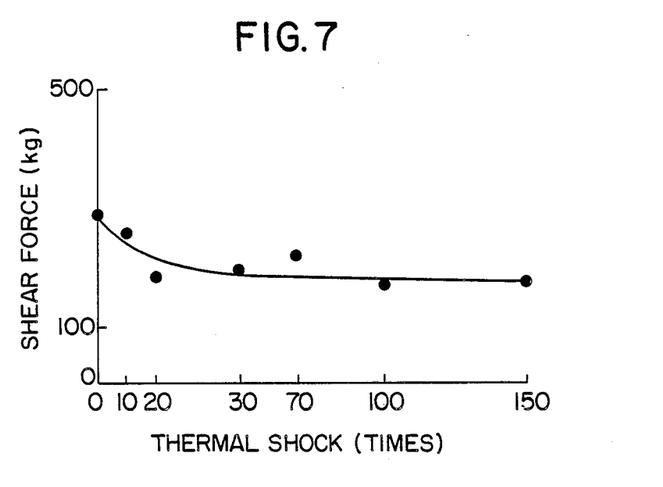
FIG. 7 is a graph showing the relationship between the integral bonding strength and the thermal shock applied to the resin-bonded magnet article.

FIG. 7 is a graph showing the relationship between the integral bonding strength and the number of times thermal shock was applied to the resin-bonded magnet article. One thermal shock was applied by heating the article at 120° C. and then dipping the article in a methanol bath kept at −30° C. The integral bonding strength is expressed in terms of a shear force between the resin-bonded magnet and the support member in the axial direction. As understood from the graph, the composite article of the present invention has high reliability.

For comparison, a mixture of 93.5% of the rare earth element-cobalt magnet element having the composition of $Sm(Co_{0.668}, Cu_{0.101}, Fe_{0.214}, Zr_{0.017})_7$ and a polyamide resin was injection molded, and a mixture of 97% of said magnet element and a liquid epoxy resin was compression molded. But, in both cases, no resin-bonded magnet article as in the present invention could be produced.

EXAMPLE 5

A mixture of acrylonitrile and methyl methacrylate in a weight ratio of 50:50 was in situ polymerized in the presence of a glycidyl ether type epoxy resin (70 g) which had been prepared by condensation of epichlorohydrin and bisphenol-A and had a viscosity [$\eta$] of 100 to 160 poises at 25° C. to produce microcapsules. The microcapsules were of single nuclear spherical form and had an average particle size of 8 $\mu$m. The content of the epoxy resin was 75% based on the total weight of the microcapsules.

In a separate step, 96 parts of thin particles of $Nd_{14}Fe_{78}B_8$ which was prepared by the melt spin method and had an inherent coercive force of 14–15 KOe and particle sizes in the range of 53 to 350 $\mu$m was mixed with 3 parts of 50% solution of the glycidyl ether type epoxy resin having a softening temperature range of 65°–75° C. (Durran's mercury method) in acetone. After evaporating off acetone, the residual solid was ground, sieved and blended to obtain intermediate granules having particle sizes in the range of 53 to 500 $\mu$m.

With the intermediate granules, 2 parts of the microcapsules, 0.45 part of 1,3-bis(hydrazinocarboethyl)-5-isopropylhydantoin and 0.20 part of calcium stearate were mixed to obtain the granular resin-bonded magnet (I) containing 95.9% of the Fe-B-R type magnet element.

Figure 8A:
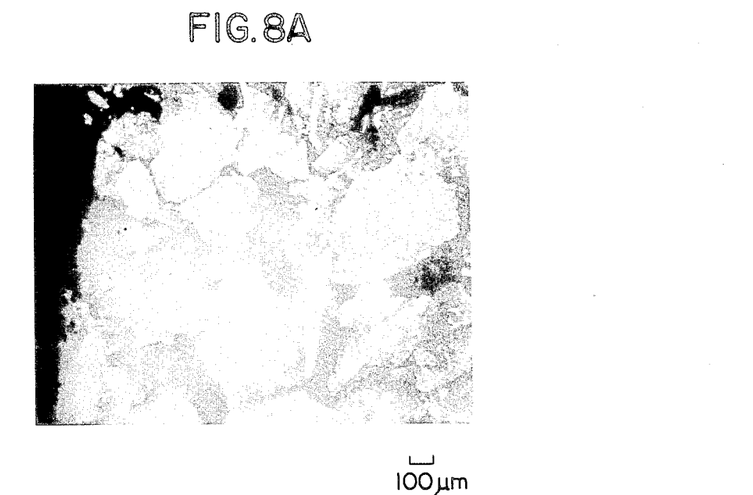
FIGS. 8A and 8B are photographs of the appearance of the granular resin-bonded magnet (I) of Example 5 hereafter with different magnifications.
Figure 8B:
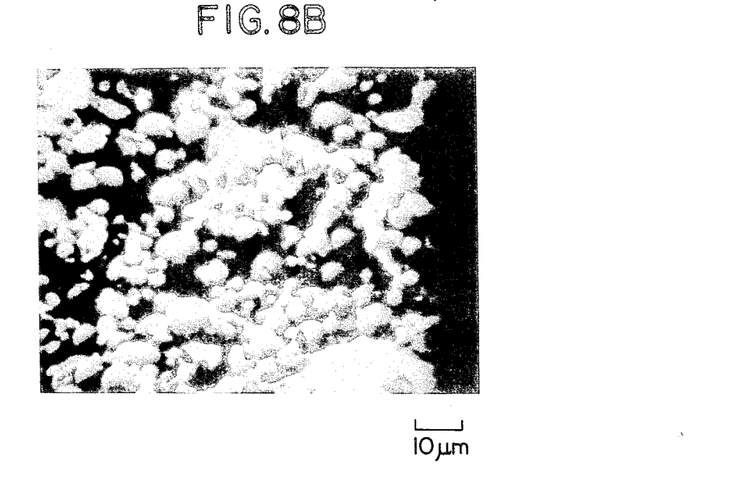

FIGS. 8A and 8B are photographs of the appearance of the granular resin-bonded magnet (I) with different magnifications. As apparent from these photographs, the microcapsules containing the liquid epoxy resin, the curing agent for the epoxy resin and calcium stearate are deposited in fine particle form on the surfaces of the intermediate granules made of the Fe-B-R type magnet element and the solid epoxy resin having the Durran's softening temperature range of 65° to 75° C. Due to such structures, the granular resin-bonded magnet compound (I) is non-tacky at room temperature and has flowability suitable for compression molding.

By using an annular shape support member consisting of 22 sheets of doughnut shaped electromagnetic steel sheet each having an outer diameter of 47.9 mm, an inner diameter of 8 mm and a thickness of 0.5 mm and the granular resin-bonded magnet (I), the green compact was bonded around the support member in the same manner as above. Then, the article was removed from the mold and heated at 120° C. for 1 hour. The green compact was firmly integrally bonded to the support member. By inserting the rotor shaft in the bore of the support member, the rotor member as shown in FIG. 4 is obtained.

In following Table 3, the outer diameters and deviation of the outer diameters of 30 resin-bonded magnet articles produced by the above described method was measured.

TABLE 3

| | Outer Diameter | Deviation of outer diameters |
|---|---|---|
| n | 30 | 30 |
| Max. (mm) | 50.280 | 0.170 |
| Min. (mm) | 50.148 | 0.06 |

TABLE 3-continued

| | Outer Diameter | Deviation of outer diameters |
|---|---|---|
| Average (mm) | 50.221 | 0.162 |
| S | 0.044 | 0.048 |
| V | 0.0019 | 0.0024 |
| R | 0.154 | 0.201 |

Although the layer of the resin-bonded magnet having a wall thickness of about 1 mm was directly bonded to the peripheral surface of the support member having the outer diameter of 47.9 mm, the articles have very good dimensional accuracy.

Figure 9:
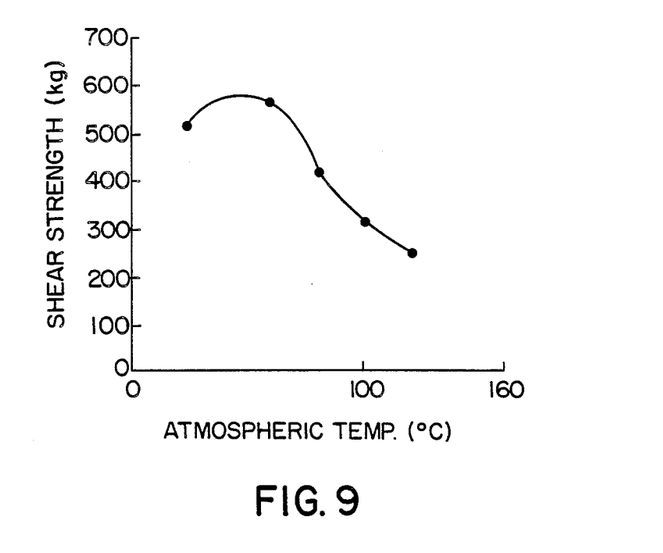
FIG. 9 is a graph showing the relationship between the shear strength between the support member and the resin-bonded magnet and the atmospheric temperature.

FIG. 9 is a graph showing the relationship between the shear strength between the support member and the resin-bonded magnet and the atmospheric temperature. As understood from this graph, the shear strength decreases at high temperatures due to the property of the binder resin. However, even at 100° C., the shear strength was still 300 kg, which means that the support member and the resin-bonded magnet were firmly integrally bonded.

Figure 10:
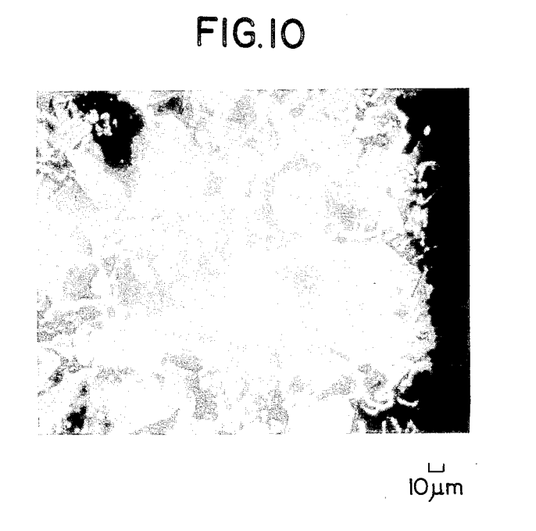
FIG. 10 is a photograph of the bonding surface of the resin-bonded magnet which was removed from the support member through shear fracture.

FIG. 10 is a photograph of the bonding surface of the resin-bonded magnet which was removed from the support member through shear fracture. This photograph shows that the microcapsules as the binder component were mechanically broken during the formation of the green compact from the granular resin-bonded magnet. The contents of the microcapsules, which was, in this Example, the glycidyl ether type epoxy resin having the viscosity of 100–160 poises at 25° C. were discharged to wet the support member directly.

EXAMPLE 6

97 Parts of thin particles of $Nd_{14}Fe_{78}B_8$ which was prepared by the melt-spin method and had an inherent coercive force of 14–15 KOe and particle sizes in the range of 53 to 350 $\mu$m was mixed with 1.6 parts of 50% solution of poly(p-vinylphenol) which is a kind of the alkenylphenyl polymer having a softening temperature range of 160°–170° C. in acetone. After grinding the mixture and evaporating off acetone, the residual solid was ground, sieved and blended to obtain intermediate granules having particle sizes in the range of 53 to 350 $\mu$m.

With the intermediate granules, 2.2 parts of the microcapsules prepared in Example 5, 0.05 part of $BF_3$/2-methylimidazole complex and 0.05 part of calcium stearate were mixed to obtain the granular resin-bonded magnet (II) containing the Fe-B-R type magnet element.

By using an annular shape support member consisting of 11 sheets of doughnut shaped electromagnetic steel sheet each having an outer diameter of 47.9 mm, an inner diameter of 8 mm and a thickness of 0.5 mm and the granular resin-bonded magnet (II), the green compact having the outer diameter of 50.2 mm was bonded around the support member in the same manner as above. Then, the article was removed from the mold and heated at 160° C. for 1 hour. The green compact was firmly integrally bonded to the support member. By inserting the rotor shaft in the bore of the support member, the rotor member was produced. The rotor member was rotated at 8,000 rpm for 6 hours in an atmosphere kept at 100° C. The resin-bonded magnet was not mechanically broken or removed from the support member by the centrifugal force.

COMPARATIVE EXAMPLE 4

97 Parts of $Sm(Co_{0.668}, Cu_{0.101}, Fe_{0.214}, Zr_{0.017})_7$ which was prepared by the melt-spin method and had an inherent coercive force of 9.5 KOe and particle sizes in the range of 32 to 106 μm was mixed with 3 parts of a mixture of the glycidyl ether type epoxy resin having a viscosity $[\eta]$ of 100 to 160 poises at 25° C. and 1-benzyl-2-methylimidazole in a weight ratio of 10:1 to prepare a compression molding grade $R(Co, Cu, Ee, M)_n$ type resin-bonded magnet raw material.

In the same manner as in Example 5, around the annular shape support member consisting of 22 sheets of doughnut shaped electromagnetic steel sheet each having an outer diameter of 47.9 mm, an inner diameter of 8 mm and a thickness of 0.5 mm, the prepared raw material was molded in the cavity having the outer diameter of 50.2 mm. It was difficult not only to charge the raw material in the cavity but also to integrally remove the molded annular composite and the support member from the mold. The green compact was removed from the support member because of spring back of the former.

COMPARATIVE EXAMPLE 5

92 parts of $Sm(Co_{0.668}, Cu_{0.101}, Fe_{0.214}, Zr_{0.017})_7$ particles which was prepared by the melt-spin method and had an inherent coercive force of 9.5 KOe was mixed with 8 parts of 12-polyamide of the formula:

$$H-[NH-(CH_2)_{11}-CO]_n-OH$$

having a relative viscosity of 1.6 (c=0.5%, m-cresol, 25° C.) to prepare an injection molding grade $R(Co, Cu, Fe, M)_n$ type resin-bonded magnet raw material.

In the same manner as in Example 6, around the annular shape support member consisting of 11 sheets of doughnut shaped electromagnetic steel sheet each having an outer diameter of 47.9 mm, an inner diameter of 8 mm and a thickness of 0.5 mm, the prepared raw material was molded in the cavity having the outer diameter of 50.2 mm. Not only was it difficult to charge the raw material in the cavity but also the resin-bonded magnet was cracked due to shrinkage caused by solidification of the melt resin.

COMPARATIVE EXAMPLE 6

Figure 11:
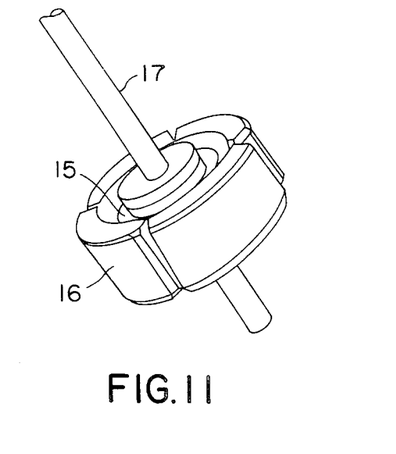
FIG. 11 shows a perspective view of a conventional rotor member.

FIG. 11 shows a perspective view of a conventional rotor member comprising a support member 15 consisting of laminated electromagnetic steel sheets each having a thickness of 0.5 mm, a sintered ferrite magnet 16 with 4.2 MGOe to which magnetic anisotropy is imparted in the wall thickness direction and a shaft 17 assembled in the support member. The ferrite magnets are bonded to the peripheral surface of the support member with an adhesive. The outer diameter of the rotor member is 50.2 mm, which is substantially the same as the diameter of the rotor member of FIG. 4 (Example 6). However, the thickness and the volume of the magnet of FIG. 11 are 1.5 times and 4 times those of FIG. 4, respectively.

Table 4 shows performances of the rotor members of FIGS. 4 and 11 when they are used in a brushless fan motor which is one of the typical permanent magnet motors.

TABLE 4

| Example No. | Torque (kg · cm) | Output (W) |
|---|---|---|
| 6 | 1.25 | 18 |

TABLE 4-continued

| Example No. | Torque (kg · cm) | Output (W) |
|---|---|---|
| Comparative 6 | 0.90 | 13 |

In Table 4, the torque and output were measured under the fan load of 1,420 rpm. In both motors, the maximum load current in the rated current of 7 to 35 V was less than 1 A.

As is apparent from the results of Table 4, the resin-bonded magnet article according to the present invention can be used in the field in which the conventional annular magnet is hardly applied.

What is claimed is:

1. A method for producing a resin-bonded magnet, which comprises steps of mixing a magnet element and microcapsules each of which contains at least one liquid component of a thermally polymerizable resin composition as a binder component, mechanically breaking at least a part of the microcapsules during formation of a green compact comprising said resin composition and said magnet element to discharge the components of said resin composition from the capsules, and curing said resin to produce the resin-bonded magnet.

2. The method according to claim 1, wherein the magnet element is a melt-spin Fe-B-R isotropic type magnet element which has a composition of the formula:

$$Fe_{100-x-y-z}Co_xR_yB_z$$

wherein R is at least one member selected from the group consisting of Nd and Pr, and x, y and z are atomic percentages of Co, R and B, respectively and satisfy the following equations:

$$0 \leq x \leq 30,$$

$$10 \leq y \leq 28,$$

$$2 \leq z \leq 12,$$

$$y + x \leq 34$$

and $$6z + y \leq 34.$$

3. A method for producing a resin-bonded magnet article, which comprises steps of granulating a melt-spin Fe-B-R isotropic type magnet raw material and an epoxy resin which is in the solid form at least at room temperature, mixing the resulting granules with microcapsules each of which contains at least a liquid epoxy resin as a binder component, fine powder of a latent curing agent for the epoxy resin and a lubricant to obtain a granular compound, providing said granular compound in a cavity formed by a support member and a mold wherein the support is heated at a temperature higher than the softening point of the solid epoxy resin and the mold is heated at a temperature lower than said softening point, pressing the provided granular compound in the cavity to mechanically break at least a part of the microcapsules to discharge the liquid epoxy resin from the capsules to form a green compact which is integrated with the support member, and curing the epoxy resins to produce the resin-bonded magnet article.

4. The method according to claim 3, wherein the support member consists of a laminated annular electromagnetic steel sheet, and the green compact is integrally molded around the spherical surface of the support member.

* * * * *